United States Patent [19]
Ferrari

[11] 3,710,982
[45] Jan. 16, 1973

[54] PLURAL SOURCE DISPENSER WITH INTERCONNECTED DISCHARGE VOLUME VARYING MEANS

[76] Inventor: Antonio Ferrari, Via Giovanni da Procida 4, Milan, Italy

[22] Filed: Sept. 7, 1971

[21] Appl. No.: 178,293

[52] U.S. Cl. ................................222/134
[51] Int. Cl. .................................B67d 5/60
[58] Field of Search........................222/1, 134

[56] References Cited

UNITED STATES PATENTS 1,964,028   6/1934   Boynton et al. ..............222/134 X
2,271,767   2/1942   Hummel.......................222/134
2,946,488   7/1960   Kraft.........................222/134
3,116,852   1/1964   Anderson ....................222/134 X
3,664,551   5/1972   Ferrari ......................222/134

Primary Examiner—Samuel F. Coleman
Attorney—Harold D. Steinberg et al.

[57] ABSTRACT

A liquid metering device comprises a driving cylinder operating the stem of a piston slidable in a first metering cylinder. The stem has a rack which is connected through a train of wheel-works to a further rack on a stem of a piston slidable in a second metering cylinder.

4 Claims, 1 Drawing Figure

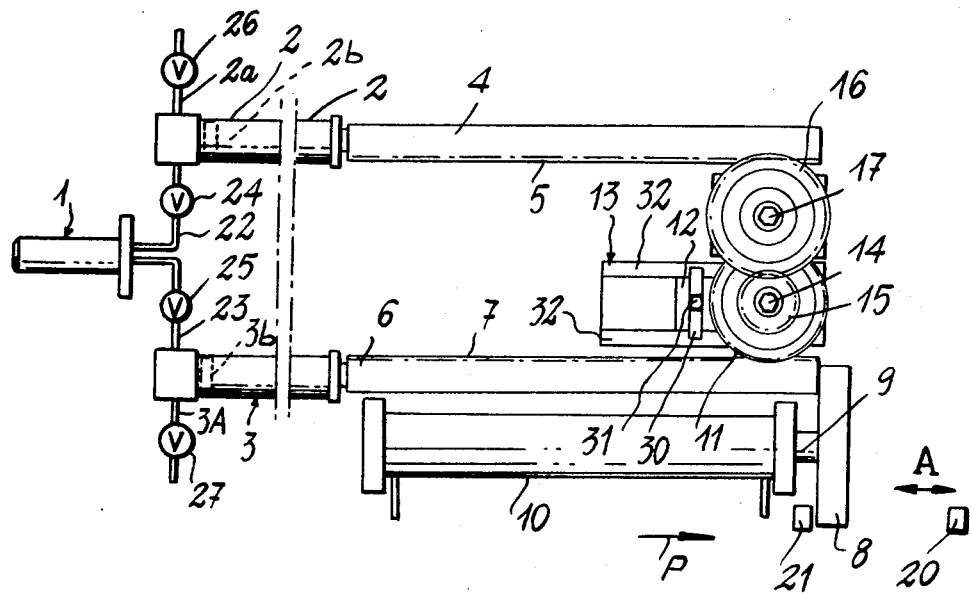

PLURAL SOURCE DISPENSER WITH INTERCONNECTED DISCHARGE VOLUME VARYING MEANS

BACKGROUND OF THE INVENTION

This invention relates to a liquid metering device for supplying a metered amount of a mixture comprising two or more components at a determined mutual ratio. More particularly, this invention relates to a metering device for apparatus producing any type of polyurethane articles, wherein a given amount of a reactive mixture of components at a given ratio is injected into a mould where the mixture expands and sets, providing for the desired article.

For example, to obtain polyurethane, two highly viscous fluids forming the polyurethane components should contact. In order to avoid a premature reaction, this contact has to start at a location as close as possible to the mould where the polyurethane forming reaction is to take place.

The weight ratios of the component amounts to be mixed will depend on the characteristics of the final polyurethane. Moreover, the amount of mixture introduced into the mould has to be proportionate to the mould cavity to be filled up.

In order to solve the metering problem, different devices have been contrived: from the metering pumps with all of the defects thereof due to the different viscosities of the materials and temperatures said materials should undergo, as well as the different densities thereof, to connecting rod systems, articulated levers, metering cylinders of a different diameter, and still other systems; however, all of these devices have not completely satisfactorily solved the metering problem, often being complicated and bulky, difficult to adjust and not enabling a proper accuracy.

SUMMARY OF THE INVENTION

The object of the present invention is to provide a liquid metering device, and particularly a metering device for the components of a reactive polyurethane forming mixture, which device is reliable in operation, easy to adjust, reduced overall size and simple structure.

The device according to the invention is essentially characterized in that an alternating motor drives a rack fast with a piston of a metering cylinder for a first component, this rack being connected through wheelworks to a second rack fast with the piston of a second metering cylinder for a second component of the mixture.

Where two or more components are to be mixed in a determined mutual ratio, the second and/or the first rack can be connected through wheelworks to the rack associated with the piston of a third metering cylinder. Substantially, as many drives of the above type can be used as the components which are to be mixed in the mixture.

The invention will be more clearly understood from the following detailed description, given by mere way of example with reference to the appended drawing, of which the only FIGURE schematically shows the device according to the invention for producing a mixture comprising only two components.

DETAILED DESCRIPTION OF THE PREFERRED EMBODIMENT

Referring to the drawing, reference numeral 1 designates as a whole a per se known mixing head or chamber, the two liquid components to be mixed as supplied by two metering cylinders 2 and 3 being fed thereto through conduits 22 and 23, in each of which a delivery valve 24,25 is provided. Inlet conduits to the cylinders 2 and 3 are shown at 2a and 3a, respectively. Inlet valves 26,27 are provided in these conduits. Conduits 2a,3a lead to tanks containing the components to be mixed in head 1. A piston 2b is slidably mounted in cylinder 2 and connected to a stem 4 which on a longitudinal side has a rack 5. Cylinder 3 is also provided with a slidable piston 3b connected to a stem 6 which on a longitudinal side has a rack 7.

Through a connecting member 8 the end of stem 6 is rigidly connected to the stem 9 of a double-acting oleodynamic cylinder 10. Of course, stem 9 is connected to the piston, not shown, slidably arranged within the cylinder 10.

Rack 7 meshes with a tooth wheel 11, rotably carried on a carriage 12 which can be moved along a guide 13 and fixed at the desired position. This guide 13 is dovetail shaped and the carriage 12 is correspondingly shaped. In order to block the slide, provision is made for a cross piece 30 and a screw 31 screwing down on the slide. By tightening said screw 31, the ends of the cross piece will firmly adhere to the upper faces 32 of the sides of guide 13. The carriage 12 can be removed from the guide 13 and replaced by another carriage provided with wheelworks of a different diameter.

On the same axis of the tooth wheel 11 a second tooth wheel 15 is provided and meshes with a tooth wheel 16 idly mounted on shaft 17. Tooth wheel 16 meshes with rack 5. Tooth wheel 16 can also be mounted on a slidable carriage which can be secured in a guide.

The operation of the above described device is as follows: When pressure fluid is supplied to the lefthand side of drive cylinder 10, stem 9, connecting member 8, rack 6 and piston 3b are caused to move in the direction of arrow P, so that through conduit 3a and open inlet valve 27, a component of the mixture enters the cylinder 3. Simultaneously with the movement of rack 7, the wheel-works 11 and 15 are rotably driven, in the particular case shown said wheelwork 15 having a lower diameter than wheelwork 11. The rotation of wheelwork 11 is transmitted to wheelwork 16 having, for example, a same diameter as wheelwork 11. Due to rotation of wheelwork 16 and connection thereof with rack 5, the stem 4 is moved in the direction of arrow P, whereby the piston 2b is moved in the same direction and the second component enters the cylinder 2 through the conduit 2a, and the open inlet valve 26. Because of the reduction ratio, as developed by the wheelworks 11, 15 and 16, the stem 4 will move a less distance than stem 6 in the direction of arrow P under the same stroke of stem 9. Thus, the component amounts entering the cylinders 2 and 3 are different and may correspond to the desired amounts when the connecting member 8 contacts, for example, an end of stroke 20 (electrical contact) movable in the direction of arrows A and fixable at the reached position, causing a pressure fluid flow on the righthand side of cylinder 10 and an outflow on the lefthand side, resulting in reversing the movement of stem 9 (movement in opposite direction to that of arrow P). By operating the end of stroke 20 by the connecting member 8, the inlet valves 26, 27, such as electromagnetic valves, are closed, these valves being provided in conduits 2a, 3a, while opening the delivery valves 24, 25 connecting the cylinders 2,3 to the mixing head, which valves were closed. The inlet and delivery valves can be electromagnetically controlled, or can be simple suction or delivery valves automatically controlled as a result of vacuum or pressure being exerted on pistons 2b,3b.

The components in cylinders 2 and 3 enter the mixing head 1 at the respective proportion thereof. At the end of the delivery movement, the connecting member 8 can act upon an end of stroke 21 (electrically contact), possibly adjustable in position, which stops the device, shutting off the pressure oil flow on the righthand side of cylinder 10, closing valves 24, 25 and opening valves 26,27.

Thus, the metering device is preset for starting a new working step when the operator of an automatic mechanism allows pressure oil to be supplied on the lefthand side of cylinder 10 and discharged on the righthand side, respectively.

By changing the ratio of the several gears, varying the tooth amount thereof and suitably moving the carriage 12 in its guide 13, different linear speeds will be obtained for stems 4, 6, as well as different strokes for the pistons 2a,3b of the two cylinders, thus obtaining predetermined changes in the amounts of the two products or components comprising the mixture. In other terms, through the above described expedients, the component ratio can be varied. The overall component amount is adjusted by moving the end of stroke 20 controlling the movement rate for stem 9 of cylinder 10.

Although only one embodiment of the invention has been described, those skilled in the art will readily contrive many changes and modifications which, however, are to be intended all within the scope of the invention.

What I claim is:

1. A metering device for liquids to be mixed, particularly for polyurethane article producing apparatus, comprising: a reciprocating motor; first rack means drivingly connected with said reciprocating motor; a piston connected with said first rack means; a first metering cylinder, said piston being slidably mounted therein; a gearing train; second rack means, said gearing train drivingly connecting said first rack means with said second rack means; a piston connected with said second rack means; a second metering cylinder, said piston being slidably mounted within said second metering cylinder.

2. A metering device according to claim 1, wherein the gearing train is a gear reduction unit.

3. A metering device according to claim 1, wherein the gearing train is a gear multiplier unit.

4. A metering device according to claim 1, wherein at least a portion of the gearing train is supported by slide means blockably mounted in guide means.

* * * * *